(12) United States Patent
Nakagawa et al.

(10) Patent No.: US 7,855,343 B2
(45) Date of Patent: Dec. 21, 2010

(54) MEASURING DEVICE HAVING HOPPER WITH ADJUSTABLE SHAPE AND ADJUSTABLE OPENING DEGREES

(75) Inventors: Yukio Nakagawa, Shiga (JP); Hiroshi Hattori, Shiga (JP); Teruo Hayakawa, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 555 days.

(21) Appl. No.: 11/917,308

(22) PCT Filed: Nov. 17, 2006

(86) PCT No.: PCT/JP2006/322965

§ 371 (c)(1),
(2), (4) Date: Dec. 12, 2007

(87) PCT Pub. No.: WO2007/063722

PCT Pub. Date: Jun. 7, 2007

(65) Prior Publication Data

US 2010/0219002 A1    Sep. 2, 2010

(30) Foreign Application Priority Data

Dec. 1, 2005    (JP) .............................. 2005-347821

(51) Int. Cl.
*G01G 19/387* (2006.01)
(52) U.S. Cl. ...................... 177/25.18; 222/77; 198/525; 198/530; 198/532; 198/550.2; 414/21
(58) Field of Classification Search ................ 198/525, 198/530–532, 550.2; 177/116–122, 105–113, 177/25.18; 222/55, 56, 77; 141/83; 414/21
See application file for complete search history.

(56) References Cited

U.S. PATENT DOCUMENTS

| | | | | |
|---|---|---|---|---|
| 4,553,617 A * | 11/1985 | Tatematsu | ................ | 177/25.18 |
| 4,767,258 A * | 8/1988 | Solvi et al. | ................... | 414/804 |
| 5,024,352 A * | 6/1991 | Gmur et al. | ..................... | 222/1 |
| 5,765,655 A * | 6/1998 | Tatsuoka | ................. | 177/25.18 |
| 6,360,787 B1 * | 3/2002 | Williamson | ................... | 141/74 |
| 7,310,923 B2 * | 12/2007 | Taylor | ......................... | 53/502 |
| 7,364,034 B1 * | 4/2008 | Clark et al. | ................. | 198/525 |
| 7,663,067 B2 * | 2/2010 | Hayakawa et al. | ........ | 177/25.18 |
| 7,712,629 B2 * | 5/2010 | Bruland | ...................... | 221/234 |
| 2009/0194558 A1 * | 8/2009 | Nakagawa et al. | .......... | 221/282 |

FOREIGN PATENT DOCUMENTS

| JP | H03-38658 Y2 | 8/1991 |
|---|---|---|
| JP | H06-18250 Y2 | 5/1994 |

\* cited by examiner

*Primary Examiner*—Randy W Gibson
(74) *Attorney, Agent, or Firm*—Global IP Counselors, LLP (57) ABSTRACT

A measuring device is arranged to store a block or group of a plurality of objects in a state where the objects are congested in the block, to suppress the scattering magnification of the objects when the objects are dropped off to prevent failures such as seal bite in a filling device disposed below the measuring device, to shorten the dropping length of the objects, and to reduce the contact resistance of the objects to a receiving opening of the filling device during the objects are dropped off to attain the discharging speed of the objects. The shapes and opening degrees of a gate unit can be changed so that a lower opening of a hopper is disposed inside the receiving opening of the filling device in a top plan view.

14 Claims, 9 Drawing Sheets

MEASURING DEVICE HAVING HOPPER WITH ADJUSTABLE SHAPE AND ADJUSTABLE OPENING DEGREES

CROSS-REFERENCE TO RELATED APPLICATIONS

This application claims priority to Japanese Patent Application No. 2005-347821 filed on Dec. 1, 2005. The entire disclosure of Japanese Patent Application No. 2005-347821 is hereby incorporated herein by reference.

TECHNICAL FIELD

The invention relates to a measuring device which temporarily stores a group of objects measured in a predetermined weight and then drops off the group of objects.

BACKGROUND ART

When dropping off and discharging a block or group of a plurality of objects (object group) measured in a predetermined weight, and filling and packing the block into a bag, a timing hopper is provided for temporarily storing the measured objects, opening a gate according to the cycle of filling work, and supplying the object to the bag. Since the timing hopper can temporarily store the object group and then open the gate at a predetermined timing to drop off the object group at once, the timing hopper can achieve the continuous filling of the object in a high speed cycle. Herein, when the object to be filled is relatively hard and has a high rebounding coefficient, the object may largely jump up and down when supplying the object to the timing hopper or the bag, which substantially lengthens the time for supplying the object to the timing hopper or the bag. When the open timing of the gate is particularly overlapped with the supply timing of the object to the timing hopper, the object jumps up and down more largely to further lengthen the time for supplying the object.

Therefore, the seal work of the bag may be performed during supplying the object without filling a sufficient amount of the objects in the bag, which generates a large weight error. Alternatively, a failure in sealing may be generated by biting of the object to a sealed part. Then, a plurality of timing hoppers are provided in a longitudinal (vertical) direction so that each of the timing hoppers temporarily dams up the object and then supplies the object to a lower stream timing hopper to reduce the dropping speed of the object and to fast settle the object in the hopper or the bag to attain the high speed delivery of the object to a filling device (for example, see Japanese Utility Model Application Publication No. 62-143601).

SUMMARY OF THE INVENTION

In order to actually supply the object to the bag set to the filling device from the timing hopper at a high speed requires smooth discharge of the object from the timing hopper and securing of the smooth passage of the object in the receiving opening of the filling device and the following object dropping route. When the length of the object in the vertical direction during dropping off the object becomes large, the rapidity of the object is spoiled by contact resistance or the like of the object to a dropping route wall. Therefore, it is extremely important to instantaneously drop off the objects as a block. Particularly, the faster supplying rate of the object increases the influence degree exerted on the dropping posture of the object by the aspect and behavior change of the object. However, even if only the provision of the plurality of timing hoppers in the longitudinal direction as described above can speed up the pace of the discharge of the object, the provision cannot speed up the discharging speed itself of the object.

In view of the above condition, the invention provides a measuring device which temporarily stores an object measured in a predetermined weight, and then drops off the object to a filling device disposed below, stores a block (object group) of a plurality of objects in a state where the objects are congested in a block, suppresses the scattering magnification of the objects when being dropped off to prevent failures such as seal bite in the filling device disposed below, shortens the dropping length of the object group and reduces the contact resistance of the objects to a side wall or the like during the objects are dropped off to accelerate the discharging speed of the objects, thereby accelerating the measurement and package of the objects.

A first aspect of the invention provides a measuring device including a measuring part and a hopper. The measuring part is configured and arranged to discharge a group of objects measured in a predetermined weight at a predetermined time interval. The hopper is disposed below the measuring part. The hopper includes a gate unit that is selectively rotatably opened/closed. The gate unit defines an upper receiving opening through which the group of objects measured in the predetermined weight is supplied from the measuring part to the hopper so that the group of objects is stored in the gate unit when the gate unit is closed. The gate unit also defines a lower discharging opening through which the group of objects is discharged to a receiving opening of a filling device disposed below the lower discharging opening when the gate unit is opened. A shape of the gate unit and opening degrees of the upper receiving opening and the lower discharging opening is adjustable so that the lower discharging opening is disposed inside the receiving opening of the filling device in a top plan view.

A second aspect of the invention provides a measuring device including a measuring part and a hopper. The measuring part is configured and arranged to discharge a group of objects measured in a predetermined at a predetermined time interval. The hopper is disposed below the measuring part. The hopper includes a gate unit that is selectively rotatably opened/closed. The gate unit defines an upper receiving opening through which the group of objects measured in the predetermined weight is supplied from the measuring part to the hopper so that the group of objects is stored in the gate when the gate is closed. The gate unit also defines a lower discharging opening through which the group of objects are discharged to a receiving opening of a filling device disposed below the lower discharge opening when the gate unit is opened. A shape of the gate unit and opening degrees of the upper receiving opening and the lower discharging opening being adjustable so that the group of objects has an overall shape with a maximum width that is smaller than a width of the receiving opening of the filling device and a width of an object dropping route of the filling device in a top plan view when the group of object is stored in the gate unit while the gate unit is closed, as measured in a rotational axis direction of the gate.

A third aspect of the invention provides a measuring device as set forth in the first or second aspect, wherein the hopper includes a gate shape changing mechanism arranged to change a width of the gate unit as measured in a rotational axis direction of the gate unit.

A fourth aspect of the invention provides a measuring device as set forth in any of the first to third aspects, wherein the gate unit includes a pair of gates with each of the gates having a plurality of gate pieces partially overlapped in a width direction of the gate, and the gate shape changing mechanism is arranged to relatively slide the gate pieces in the width direction to change the width of the gate unit.

A fifth aspect of the invention provides a measuring device as set forth in any of the first to fourth aspects, wherein the gate unit includes a pair of gates with each of the gates having a center face part that forms a center surface arranged to receive the group of objects stored in the gate unit when the gate unit is closed, and a pair of side face parts extending from both side edges of the center face part that forms side surfaces arranged to receive the group of objects stored in the gate unit when the gate unit is closed, and the gate shape changing mechanism is arranged to change an inclination angle of the side face parts with respect to a vertical center axis of the hopper.

A sixth aspect of the invention provides a measuring device as set forth in the fifth aspect, wherein the gate shape changing mechanism is arranged to change the inclination angle of the side face parts so that inner surfaces of the side face parts are oriented toward a downward direction.

A seventh aspect of the invention provides a measuring device as set forth in any of the first to sixth aspects, wherein the gate unit is arranged such that an operation and the shape of the gate unit are changed according to information relating to at least one of the receiving opening of the filling device and the object dropping route of the filling device.

An eighth aspect of the invention provides a measuring device as set forth in any of the first to seventh aspects, further including a detecting section disposed in a downstream portion of the hopper to detect a dropping length of the group of objects, wherein the gate unit being arranged such that an operation and the shape of the gate unit are changed based on a detection result of the detecting section.

The measuring device according to the first aspect of the invention exhibits the following excellent effect. Since the shape and opening degree of the gate unit itself can be changed so that the lower opening of the hopper is smaller than the receiving opening of the filling device, the measuring device can store the objects in a state where the objects are congested in a block, and can suppress the scattering magnification of the objects when the objects are dropped off to prevent failures such as seal bite in the filling device disposed below. The measuring device can shorten the dropping length of the objects and can reduce the contact resistance of the objects to the receiving opening to instantaneously drop off the objects. As the result, the measuring device can attain the high speed of a measurement packaging process.

The measuring device according to the second aspect of the invention exhibits the following excellent effect. Since the measuring device holds the objects stored in the hopper so that the object has a smaller width than those of the receiving opening of the filling device and following object dropping route in the plan view, the measuring device can store the objects in a state where the objects are congested in a block, and can suppress the scattering magnification of the objects when the objects are dropped off to prevent failures such as seal bite in the filling device disposed below. Particularly, the measuring device can shorten the dropping length of the objects discharged from the lower opening and can reduce the contact resistance of the objects to the receiving opening to instantaneously drop off the objects. As the result, the measuring device can attain the high speed of a measurement packaging process.

The measuring device according to the third aspect of the invention exhibits the following excellent effect as well as the effects exhibited by the measuring device according to the first or second aspect. Since the measuring device is provided with the gate shape changing mechanism capable of changing the width itself of the gate unit, it is not necessary to add another member for adjusting the size of the lower opening and the lateral width of the stored object and exchange the gate shape changing mechanism with another member.

The measuring device according to the fourth aspect of the invention exhibits the following excellent effect as well as the effect exhibited by the measuring device according to any of the first to third aspects. The measuring device can relatively slide the plurality of gate pieces partially overlapped in the width direction to easily change the width of the gate unit.

The measuring device according to the fifth aspect of the invention exhibits the following excellent effect as well as the effect exhibited by the measuring device according to any of the first to fourth aspects. The measuring device can change the inclination angle of the side face of the storing part to adjust the flow of the objects dropped off and discharged.

The measuring device according to the sixth aspect of the invention exhibits the following excellent effect as well as the effect exhibited by the measuring device according to the fifth aspect. The measuring device can change the inclination angle so that the inner face of the side face part is directed downward to reduce the contact resistance of the objects and storing part when the objects are dropped off and discharged. As a result, the measuring device can further enhance the dropping discharge speed of the objects.

The measuring device according to the seventh aspect of the invention exhibits the following excellent effect as well as the effect exhibited by the measuring device according to any of the first to sixth aspects. Since the measuring device changes the operation and shape of the gate unit according to the information (for example, a diameter, a route length, a kind of an object received, or the like) relating to the receiving opening and the object dropping route, the measuring device can promptly change a preparatory plan accompanying the kind change or the like of the object.

The measuring device according to the eighth aspect of the invention exhibits the following excellent effect as well as the effect exhibited by the measuring device according to any of the first to seventh aspects. Since the measuring device changes the operation and shape of the gate unit based on the detected result of the dropping length of the object, the measuring device can further enhance the dropping discharge speed of the object while operating.

BRIEF DESCRIPTION OF THE DRAWINGS

4, and the diagram (b) is a top plan view of the gate unit in the state illustrated in the diagram (a).

BEST MODE FOR CARRYING OUT THE INVENTION

Hereinafter, an embodiment of the invention will be described with reference to the accompanying drawings.

Measuring Device 1

Figure 1:
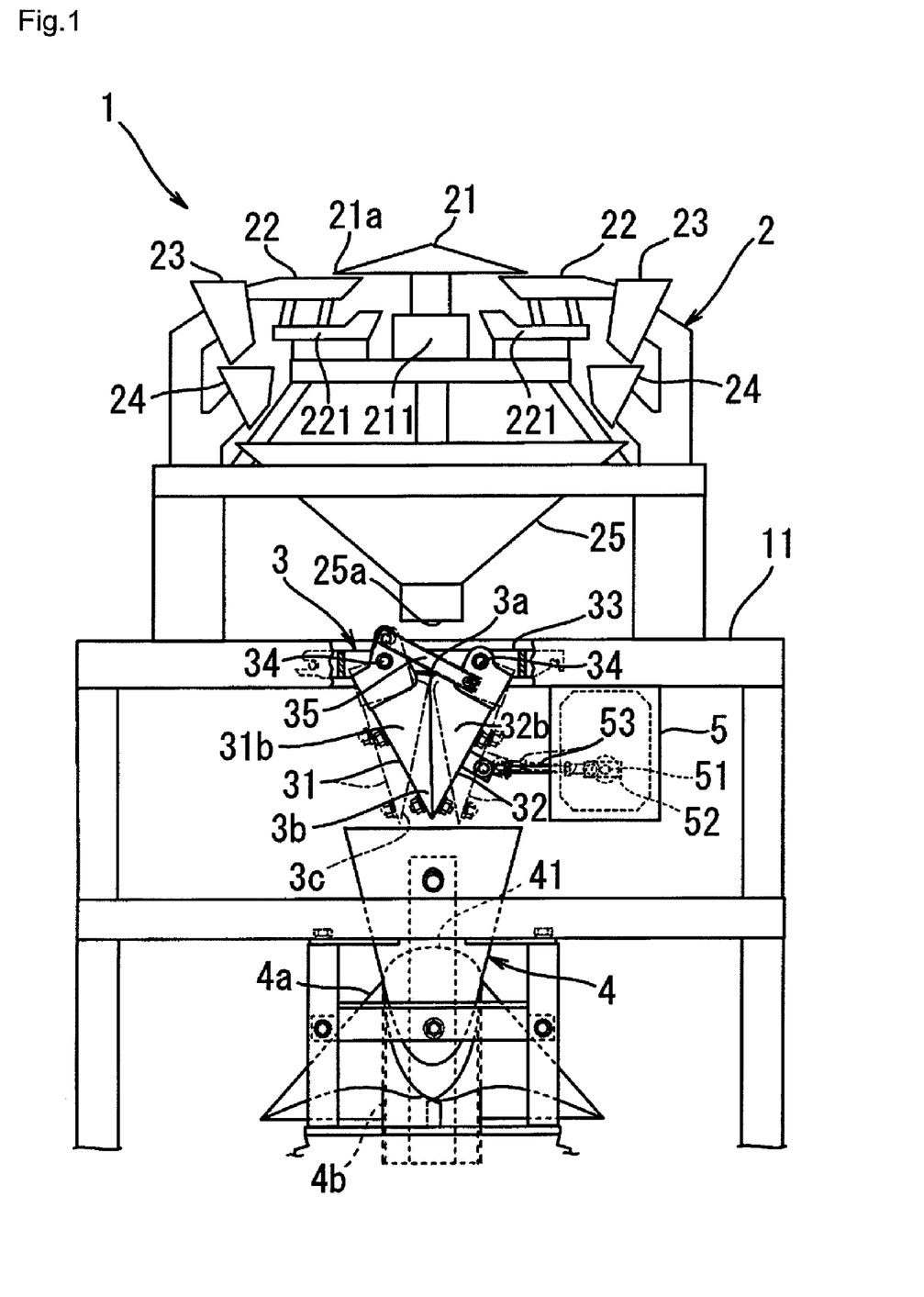
FIG. 1 is a front view of a measuring device according to an embodiment of the invention.
Figure 2:
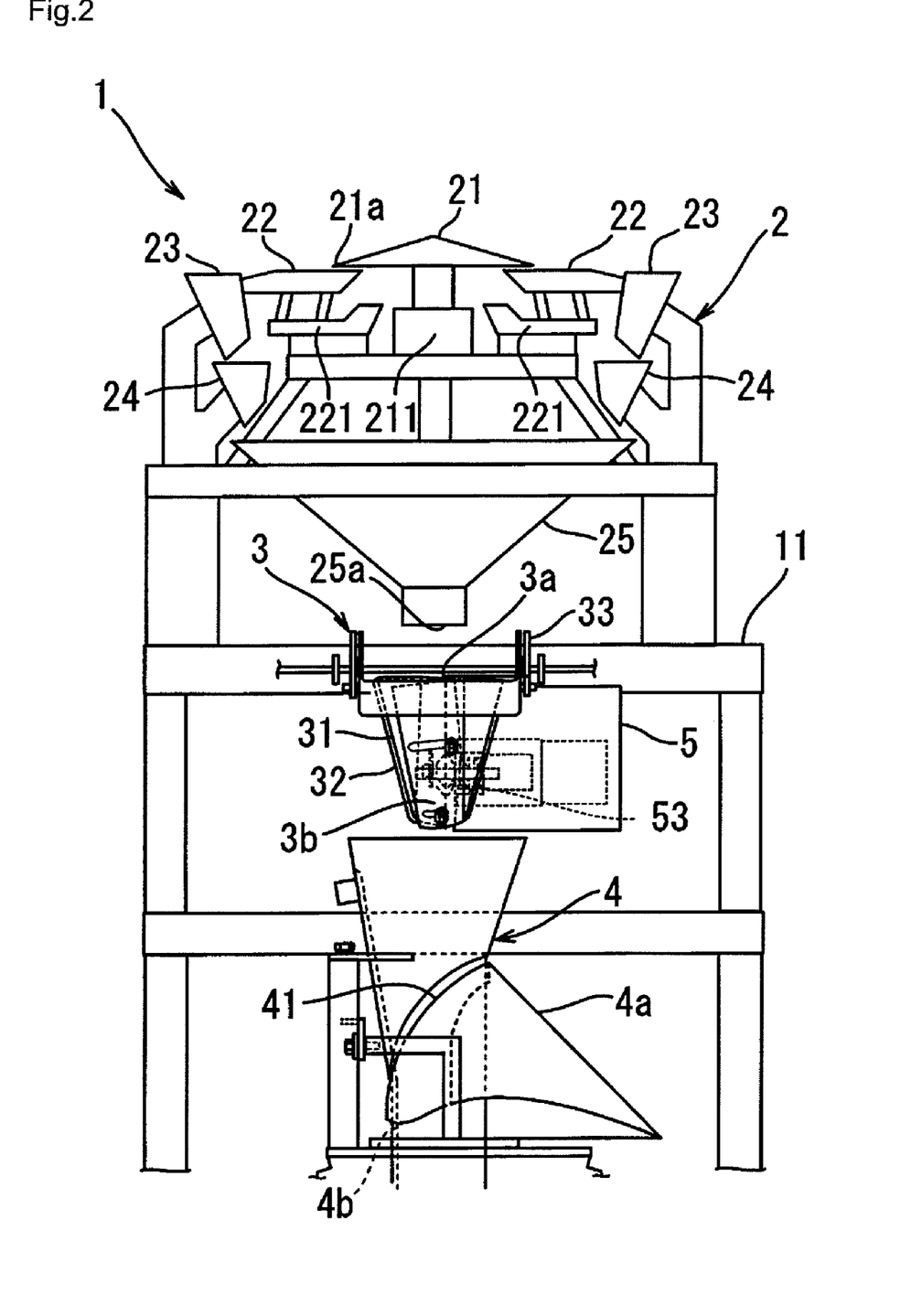
FIG. 2 is a side view of the measuring device illustrated in FIG. 1 according to the embodiment of the invention.

A measuring device 1 shown in FIGS. 1, 2 is provided with a measuring part 2 and a hopper 3. The measuring part 2 discharges an object measured in a predetermined weight onto a base table 11 at a predetermined time interval. The hopper 3 includes a storing part 3b having beak-shaped gates 31, 32 selectively and rotatably opened/closed. The gates 31, 32 together form a gate unit. The hopper 3 receives the objects measured in the predetermined weight by the measuring part 2 from an upper opening 3a (upper receiving opening) of the hopper 3, and temporarily stores the objects in the storing part 3b in which the gates 31, 32 are closed. The hopper 3 drops off and discharges the objects from a lower opening 3c (lower discharging opening) formed by opening the gates 31, 32 to supply the object to a receiving opening 41 of a filling device 4 disposed below the lower opening 3c.

Measuring Part 2

The measuring part 2 shown in FIGS. 1, 2 temporarily disperses loosened objects respectively having different weights on a plurality of routes; respectively measures the weights of the dispersed objects; and discharges the combination of a predetermined target weight based on these measured values with every predetermined time. The measuring part 2 is provided with a dispersing table 21, a plurality of vibration troughs 22, a plurality of pool hoppers 23, a plurality of measuring hoppers 24 and a collecting chute 25. The vibration troughs 22 are radially arranged around the dispersing table 21. The pool hoppers 23 and the measuring hoppers 24 are circularly disposed so as to correspond to the vibration troughs 22. The collecting chute 25 is disposed below the measuring hoppers 24.

The dispersing table 21, which is a conical table body for loading objects to be supplied from an object supplying device (not shown), is micro-vibrated by a vibrator 211 to disperse the objects on a plurality of radially formed routes to drop off the objects from a peripheral edge part 21a. The vibration troughs 22 receive the objects dispersed on the plurality of routes by the dispersing table 21, and vibrate the received objects using vibrators 221 to supply the objects to the pool hopper 23 by nearly a constant amount. The vibration troughs 22 are slightly inclined so that the objects are easily moved to the pool hopper 23. The pool hoppers 23 temporarily hold the supplied objects, and drops off and discharges the objects when the measuring hopper 24 located immediately below the pool hopper 23 is empty. The measuring hopper 24 measures the weights of the objects using a load cell, and drops off and discharges the objects of the combination of a predetermined target weight into the collecting chute 25. The collecting chute 25 gathers a block or group of the plurality of objects (object group) supplied from the measuring hopper 24 to one place, and discharge the objects from an exit 25a.

Hopper 3

Figure 3:
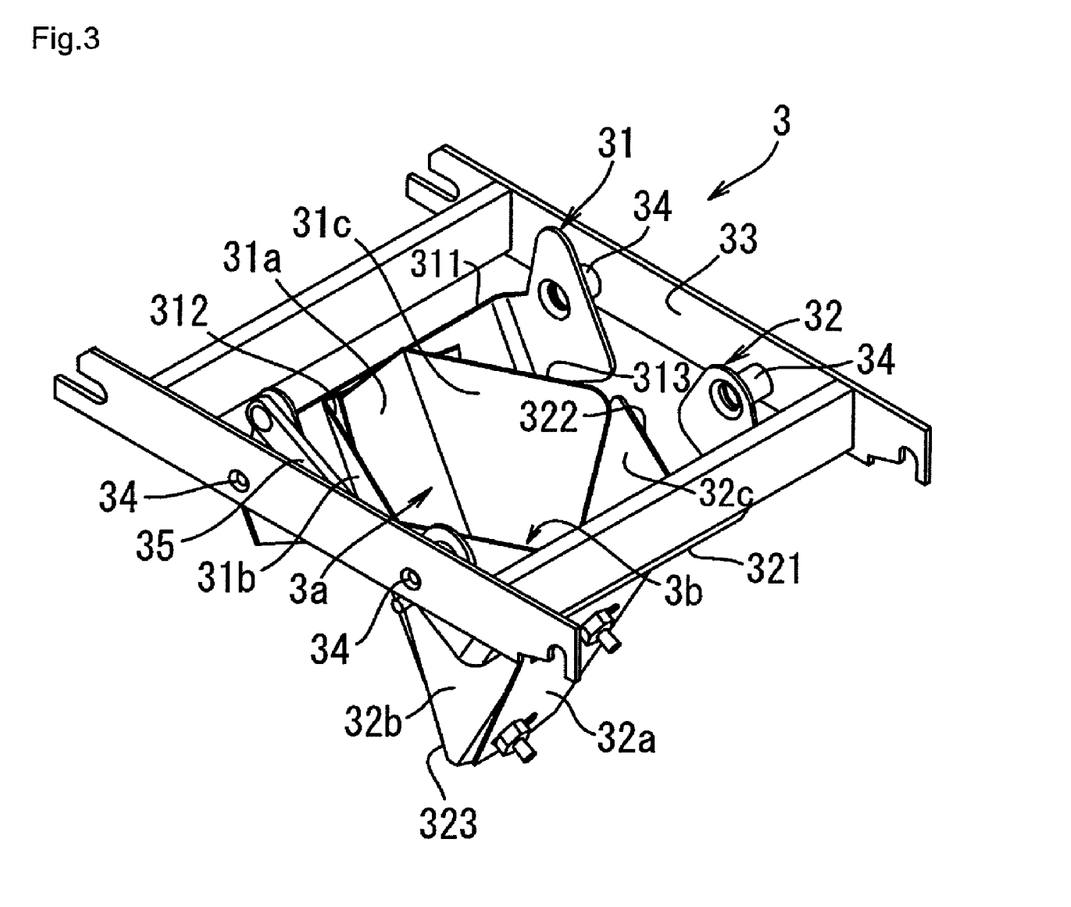
FIG. 3 is an enlarged perspective view of a hopper provided in measuring device according to the embodiment of the invention.

The hopper 3 is a timing hopper for temporarily storing the object group supplied from the collecting chute 25, and then discharging the object group at a predetermined timing in accordance with the work cycle of the filling device 4 to supply the object group into a packing container (bag) set in the filling device 4. The hopper 3 is arranged so that the upper opening 3a faces the exit 25a of the collecting chute 25. As shown in FIG. 3, referring to the hopper 3, the gates 31, 32 are supported by a frame-shaped bracket 33 using support pins 34 so as to be rotatably opened/closed about rotational axes of the gates 31, 32. The gates 31, 32 are closed as shown in FIG. 1 by solid line to form the storing part 3b storing the objects received from the upper opening 3a. As shown in FIG. 1 by dashed line, the gates 31, 32 are opened to form the lower opening 3c supplying the objects into the filling device 4.

Gates 31, 32

Figure 4:
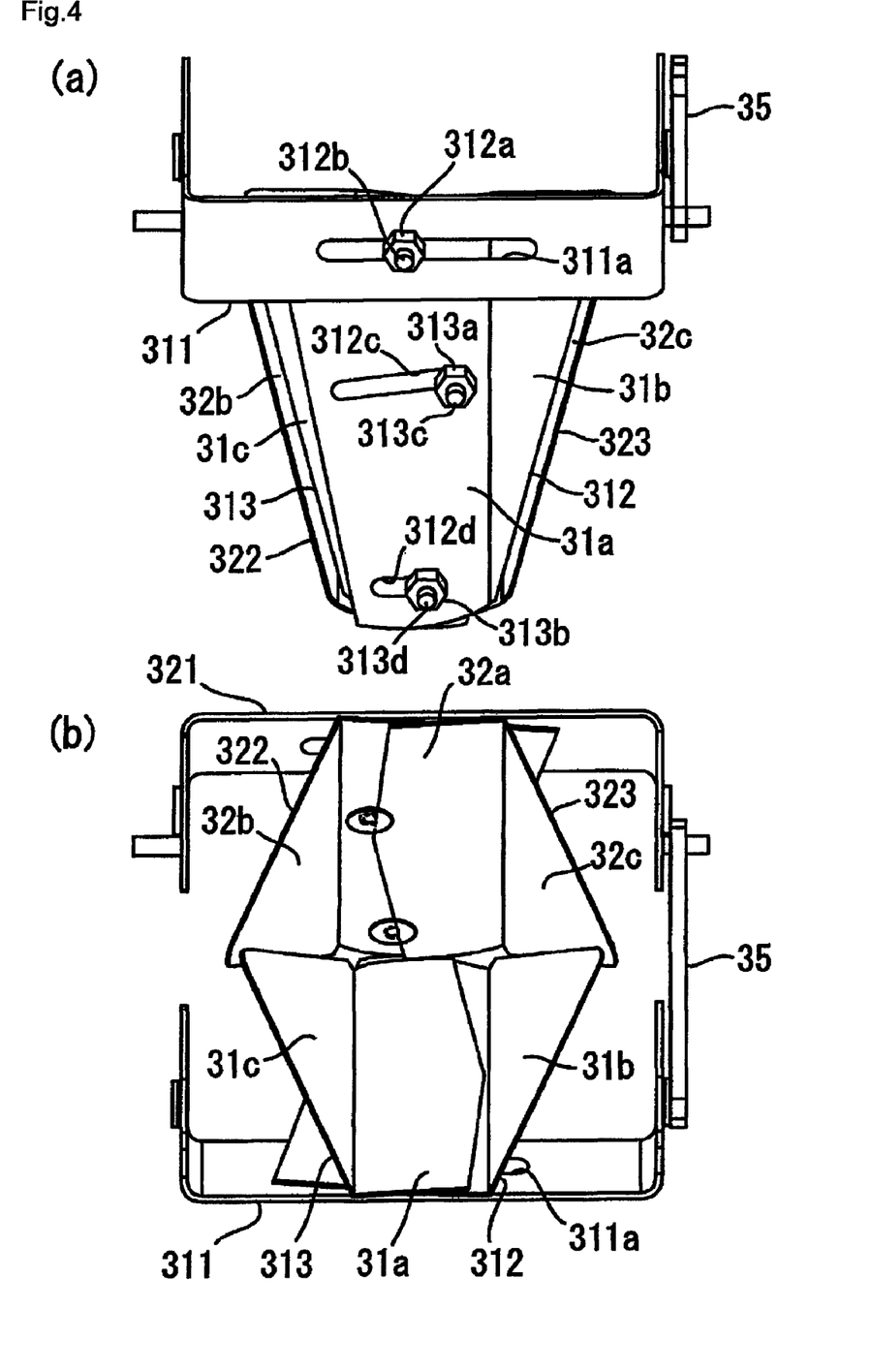
FIG. 4 includes diagrams (a) and (b), wherein the diagram (a) is a side view of a gate unit of the hopper illustrated in FIG. 3 provided in the measuring device according to the embodiment of the invention, and the diagram (b) is a top plan view of the gate unit illustrated in the diagram (a)
Figure 5:
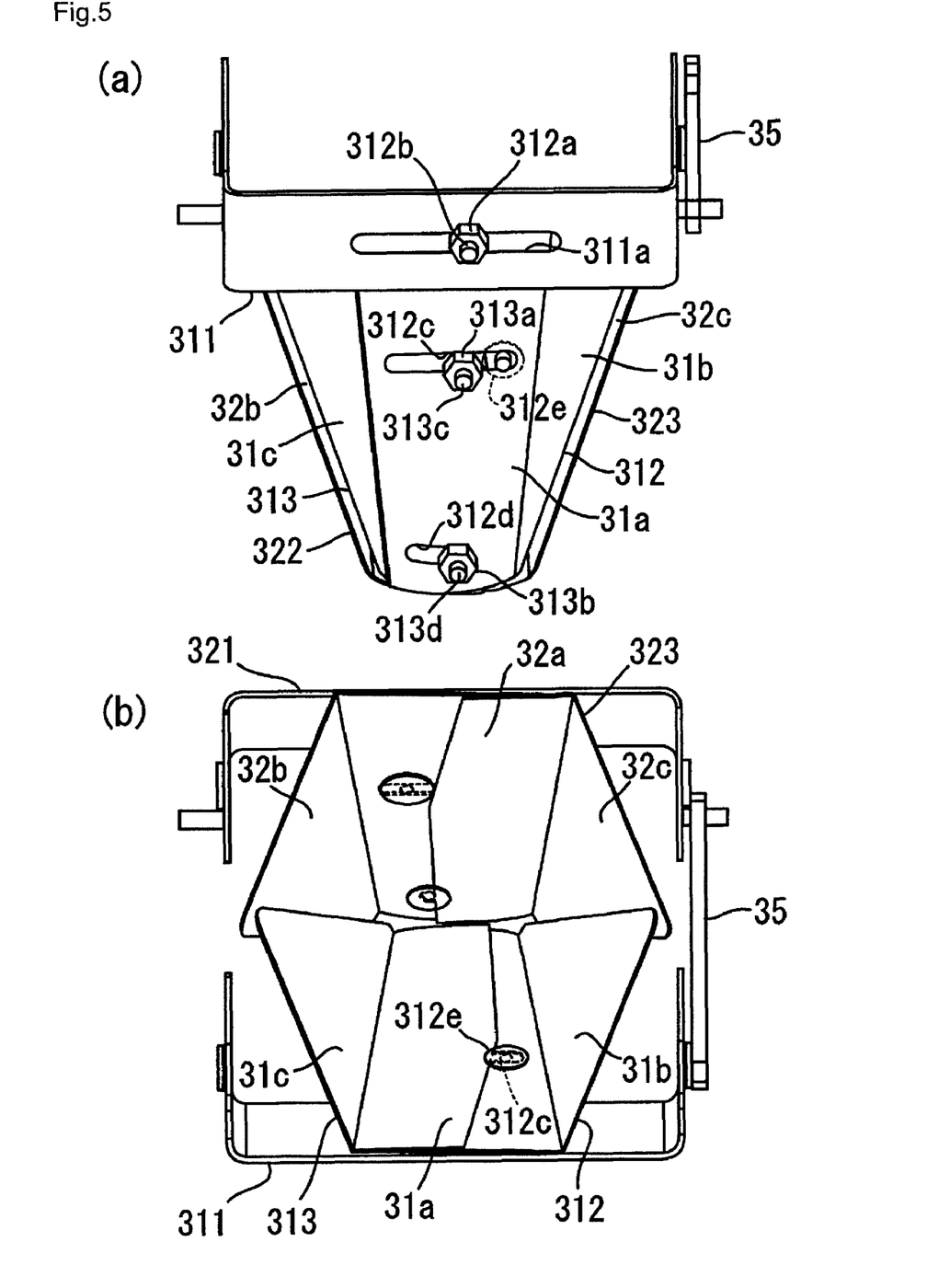
FIG. 5 includes diagrams (a) and (b), wherein the diagram (a) is a side view of the gate unit illustrated in FIG. 3 showing a state where an inclination angle of side face parts of the gate unit is made larger than that shown in the diagram (a) of FIG.
Figure 6:
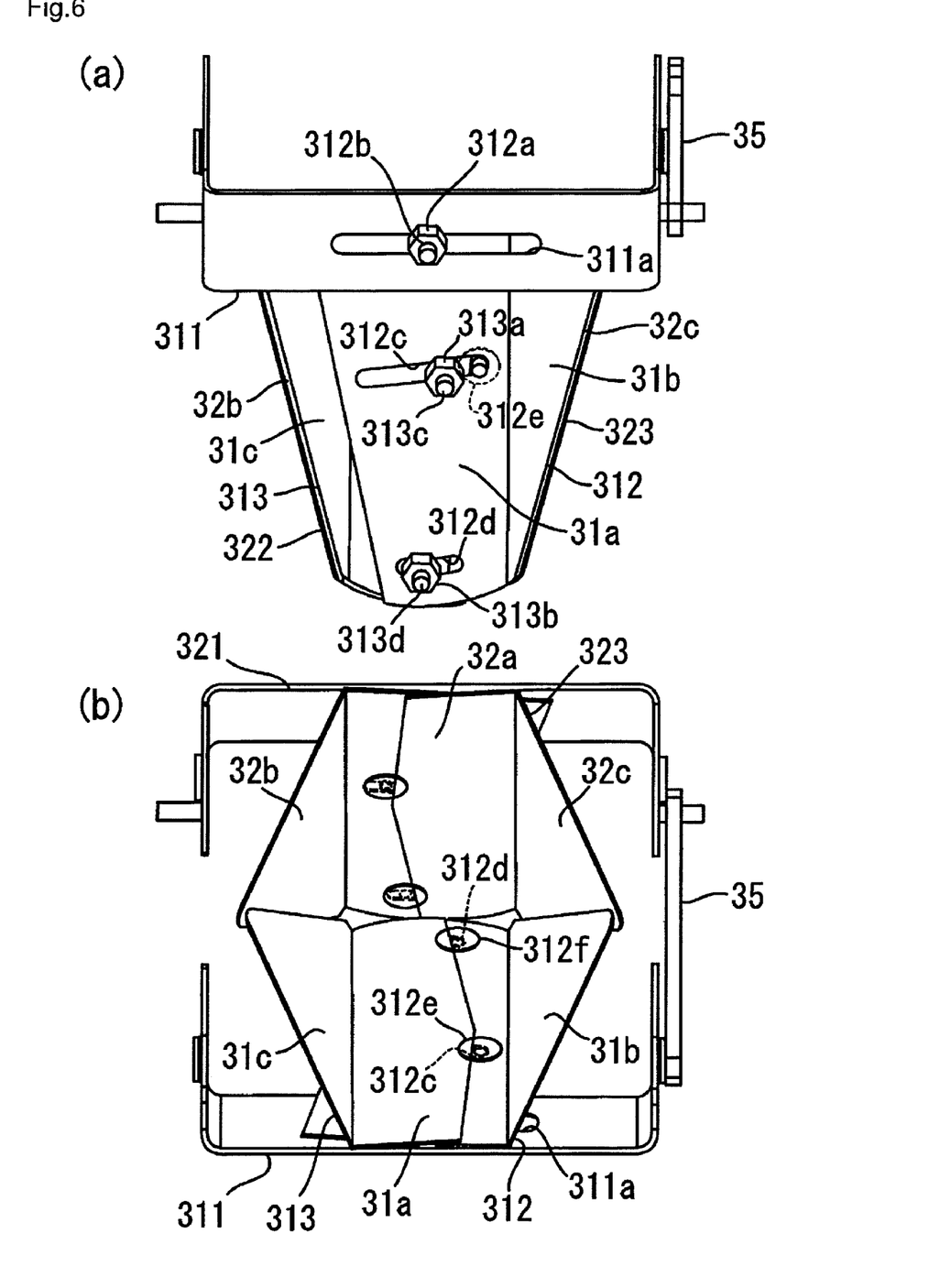
FIG. 6 includes diagrams (a) and (b), wherein the diagram (a) is a side view of the gate unit illustrated in FIG. 3 showing a state where a width of the gate unit is made larger than that shown the diagram (a) in FIG. 4, and the diagram (b) is a top plan view of the gate unit in the state illustrated in the diagram (a)

As shown in FIG. 3, the gates 31, 32 are respectively provided with bottom face parts 31a, 32a (center face part) and side face parts 31b, 31c and 32b, 32c. The bottom face parts 31a, 32a respectively receive the objects stored in the storing part 3b from the lower part. The side face parts 31b, 31c and 32b, 32c extend from the both side ends (edges) of the bottom face parts 31a, 32a to form the side face of the storing part 3b. As shown in FIGS. 4 to 6, the gates 31, 32 are formed by a plurality of gate pieces 312, 313 and 322, 323 partially overlapped in the lateral width direction (i.e., in the rotational axis direction of the gates 31, 32). These gate pieces can be relatively slid in the lateral width direction to change the widths (gate widths) of the bottom face parts 31a, 32a as measured in the rotational axis direction of the gates 31, 32, or the gate pieces can be relatively rotated about a direction perpendicular to the rotational axis direction of the gates 31, 32 to change the inclination angles of the side face parts 31b, 31c, 32b, 32c with respect to a vertical center axis of the hopper 3. That is, the gates 31, 32 are provided with a gate shape changing mechanism capable of changing an overall the shape of the gates unit (including the gates 31, 32) itself.

Gate Shape Changing Mechanism

As shown in FIG. 3, the gate 31 is composed by attaching the generally L-shaped first gate piece 312 and second gate piece 313 to a generally U-shaped gate base end part 311. The first gate piece 312 and the second gate piece 313 are partially overlapped with the gate base end part 311 in the lateral width direction to form a part of a beak shape. The gate base end part 311 has both ends rotatably supported by the bracket 33 using the support pins 34. The first gate piece 312 cooperates with the second gate piece 313 to form the bottom face part 31a of the gate 31 and also forms the side face part 31b extending from the bottom face part 31a. The second gate piece 313 cooperates with the first gate piece 312 to form the bottom face part 31a and also forms the side face part 31c extending from the bottom face part 31a. As shown in FIGS. 4 to 6, a slide groove 311a generally extending in the lateral width direction is formed in the gate base end part 311. A bolt 312b is provided on the outer side face of the first gate piece 312, and the bolt 312b is inserted into the slide groove 311a and tightened by a nut 312a to fix the gate base end part 311 and the first gate piece 312 so that the gate base end part 311 and the first gate piece 312 are not relatively moved. Slide grooves 312c, 312d generally extending in the lateral width direction are formed in a part which is not overlapped with the gate base end part 311 in the first gate piece 312.

Bolts 313c, 313d are provided on the second gate piece 313 overlapped with the inner side face of the first gate piece 312. The bolts 313c, 313d are inserted into the slide grooves 312c, 312d and are tightened with nuts 313a, 313b to fix the first gate piece 312 and the second gate piece 313 so that the first gate piece 312 and the second gate piece 313 are not relatively moved. Therefore, the width (gate width) and the gate position of the bottom face part 31a can be changed by loosening the nuts 312a, 313a, 313b and by sliding the first gate piece 312 and the second gate piece 313 in the lateral width direction. The inclination angles of side face parts 31b, 31c can be changed by loosening the nuts 312a, 313a, 313b and rotating the first gate piece 312 and the second gate piece 313 about a direction perpendicular to the rotational axis direction of the gates 31, 32. When the slide grooves 312c, 312d are communicated with the outside of the hopper (i.e., when the slide grooves 312c, 312d are exposed to form a communication path between inside and outside of the hopper 3), as shown in FIGS. 5, 6, the slide grooves can be covered with lid members 312e, 312f to prevent the deviation of the objects. As the lid member, an adhesive seal capable of being peeled off (as shown in FIGS. 5, 6), a hook fitted into the slide groove and the like can be employed.

As in the gate 31, the gate 32 disposed so as to face the gate 31 is also composed by attaching the generally L-shaped first gate piece 322 and second gate piece 323 to a generally U-shaped gate base end part 321. The first gate piece 322 and the second gate piece 323 are partially overlapped with the gate base end part 321 in the lateral width direction to form a part of the beak shape. The gate base end part 321 is rotatably supported by the bracket 33 using the support pins 34. The first gate piece 322 cooperates with the second gate piece 323 to form the bottom face part 32a and also forms the side face parts 32b, 32c. The first gate piece 322, which is inserted into the slide groove of the lateral width direction formed in the gate base end part 321, is provided with a bolt tightening and fixing the gate base end part 321 and the first gate piece 322 using a nut. Slide grooves 322c, 322d are formed in a part which is not overlapped with the gate base end part 321.

The second gate piece 323 overlapped with the inner side of the first gate piece 322, which is inserted into the slide grooves 322c, 322d, is provided with a bolt tightening and fixing the first gate piece 322 and the second gate piece 323 using a nut. Therefore, the width (gate width) of the bottom face part 32a, the gate position and the inclination angles of the side face parts 32b, 32c can be changed by loosening the nut in the gate 32 as in the gate 31. When the slide grooves 322c, 322d are communicated with the outside of the hopper, the slide grooves may be covered with the lid member as in the gate 31.

Gate Drive Mechanism of Gates 31, 32

Next, a gate drive mechanism for rotatably opening/closing the gates 31, 32 will be described. As shown in FIG. 1, a drive unit 5 is fixed to the base table 11 near the gate 31. The drive unit 5 has a crank arm 52 attached to a rotating shaft 51 driven by a motor. The crank arm 52 is connected to the gate 31 by an oscillation link 53. The gates 31, 32 are mutually connected by an oscillation link 35 for simultaneously opening and closing the gates 31, 32. Thereby, when the rotating shaft 51 is half-rotated, the gates 31, 32 are oscillated to an open position shown by dashed line in FIG. 1 from a closed position shown by solid line. The rotating shaft 51 is further half-rotating to oscillate the gates 31, 32 to the original closed position. Although the detailed structure is not shown, the rotating radius (attaching position of the crank arm 52 to the rotating shaft 51) of the crank arm 52 and the length of the oscillation link 35 can be adjusted. Thereby, the opening degrees of the gates 31, 32 can be changed.

As described above, the hopper 3 can set the gate shape and gate opening degree capable of supplying the objects to the filling device 4 at highest speed according to the kind and amount or the like of the objects to be stored, and the size or the like of the receiving opening 41 of the filling device 4 arranged below.

Filling Device 4

The filling device 4 shown in FIGS. 1, 2 introduces a belt-like film reeled out from a non-shown film roll into a forming device 4a, and winds the film around a tube 4b to form the film in a cylindrical shape. A non-shown adsorption belt, which is provided on the lower side face of the tube 4b, downwardly conveys the film formed in a cylindrical shape. The overlapping part and lower end part of the side face of the cylindrical film are welded and sealed during the conveyance of the film. The objects are supplied through the receiving opening 41 from the hopper 3, and the upper end part is then welded and sealed to form a bag in which the objects are filled and packed. When the filling device 4 changes the belt-like film to be used according to the kind and amount or the like of the objects or exchanges the forming device 4a and the tube 4b with that having a different size, the filling device 4 changes the size of the receiving opening 41. Herein, the tube 4b contains not only a closed section shape but also, for example, a U-shaped section. Therefore, the receiving opening 41 includes the opening of the bag formed by the filling device 4 as well as one formed by the filling device 4 itself.

Changing Work of Gate Shape or The Like

The high speed supply of the objects to the bag formed by the filling device 4 indispensably requires the smooth discharge of the objects from the hopper 3 and the smooth pass of the objects in the receiving opening 41 and the following object dropping route without resistance. Therefore, the shapes and opening degrees of the gates 31, 32 can be changed by adjusting the gate shape changing mechanism and the gate drive mechanism so that the lower opening 3c of the hopper 3 is contained inside the receiving opening 41 in a top plan view or so that the objects stored in the hopper 3 have an overall shape having a maximum width smaller than those of the receiving opening 41 and following the object dropping route in a top plan view as measured in the rotational axis direction of the gates 31, 32. For example, when few objects are filled and packed, the objects can be dropped off and discharged in a short time. However, when the size of the bag to be packed is small, and thereby the diameter of the receiving opening 41 is also narrowed, as shown in FIG. 4, the widths and the opening degrees of the gates 31, 32 can be narrowly set to reduce the contact resistance of the objects to the receiving opening 41 to instantaneously supply the objects.

For example, when the opening of the packaging bag is small and the diameter of the receiving opening 41 is also narrowed although many objects are filled and packed, as shown in FIG. 5, the lower end widths and the opening degrees of the gates 31, 32 are narrowly set and the inclination angles of the side face parts 31b, 31c are enlarged (set down). In other words, the side face parts 31b, 31c are inclined so that the inclination angles formed between the vertical center axis of the hopper 3 and the side face parts 31b, 31c becomes larger. Thereby, the contact resistance of the objects to the receiving opening 41 can be reduced and the dropping length of the objects can be shortened to supply the objects for a short time. Furthermore, for example, when the opening of the bag packing the objects is large and the diameter of the receiving opening 41 is also large, as shown in FIG. 6, the whole widths and opening degrees of the gates 31, 32 can be widely set and the inclination angles of the side face parts 31b, 31c can be reduced (set up). In other words, the side face parts 31b, 31c are inclined so that the inclination angles formed between the vertical center axis of the hopper 3 and the side face parts 31b, 31c becomes smaller. Thereby, the contact resistance of the objects to the side face part or the bottom face part object can be reduced to supply the objects for a short time.

By the way, when an operator changes the shapes and operations (opening degree or the like) of the gates 31, 32, the operator must perform an adjustment work according to the information (for example, the diameter, the route length, and the kind of objects to be received, or the like) relating to the receiving opening 41 and the following object dropping route. However, if the operator performs a test run to determine an optimal setting value whenever changing the shape and operation of the gate, the preparatory plan accompanying the change of the kind of the objects takes a lot of time. Then, it is preferable to determine in advance the optimal setting value and setting procedure corresponding to the above information, or produce in advance a program defining the deciding method and only input information into a personal computer or the like to automatically output the optimal setting value and setting procedure.

Feature of Measuring Device According to the Embodiment

The measuring device 1 according to the embodiment has the following features. First, the shapes and opening degrees of the gates 31, 32 can be changed so that the lower opening 3c of the hopper 3 is smaller than the receiving opening 41 of the filling device 4 in a plan view or so that the lateral widths of the objects stored in the storing part 3b are smaller than those of the receiving opening 41 of the filling device 4 and following object dropping route. Therefore, the measuring device 1 has the following feature. Failures such as seal bite in the filling device 4 can be prevented by storing the objects in the storing part 3b in a state where the objects are congested in a block and by suppressing the scattering magnification of the objects when the objects are dropped off. Furthermore, the objects can be dropped off for a short time by shortening the dropping length of the objects and by reducing the contact resistance of the objects to the receiving opening 41.

Secondly, since the gates 31, 32 are provided with the gate shape changing mechanism for changing the width itself of the gate, the measuring device 1 has the following feature. It is not necessary to add another member to the gate in order to adjust the size of the lower opening 3c and the widths of the objects stored in the hopper 3 or exchange the gate with another gate. Particularly, since the width of the gate can be easily changed only by relatively sliding the gate pieces partially overlapped with each other in the width direction, the preparatory plan work can be efficiently performed.

Thirdly, the gates 31, 32 are provided with the bottom face parts 31a, 32a for receiving the objects stored in the storing part 3b from the lower part and the side face parts 31b, 31c, 32b, 32c extending from both the side ends to form the side face of the storing part 3b, and can change the inclination angles of the side face parts. Thereby, the measuring device 1 has the following feature. The flow of the objects can be adjusted so that the contact resistance of the objects to be dropped off and discharged and side face parts is suppressed to discharge the objects for a short time. Particularly, since the inclination angles of the side face parts can be easily changed only by relatively rotating each of the gate pieces, the preparatory plan work can be efficiently performed.

Fourthly, since the shapes and operations (opening degree or the like) of the gates 31, 32 are previously changed according to the information (for example, the diameter, the route length, the kind of the objects to be received, or the like) relating the receiving opening and the object dropping route, the measuring device 1 has the following feature. The preparatory plan accompanying the kind change of the objects can be promptly performed.

Modification of the Embodiment

As shown in FIGS. 4 to 6, the above embodiment explains only the case where the inner surfaces of the side face parts 31b, 31c, 32b, 32c are oriented toward an upward direction (i.e., the inclination angles of the side face parts 31b, 31c, 32b, 32c are adjusted so that a width between the side face parts 31b, 31c, 32b, 32c at an upper portion of the hopper 3 is larger than a width between side face parts 31b, 31c, 32b, 32c at a lower portion of the hopper 3). However, the measuring device of the present invention can be arranged so that the inclination angles of the side face parts 31b, 31c, 32b, 32c are adjusted such that inner faces of the side face parts are oriented toward a downward direction (i.e., the inclination angles of the side face parts 31b, 31c, 32b, 32c are adjusted so that a width between the side face parts 31b, 31c, 32b, 32c at an upper portion of the hopper 3 is smaller than a width between side face parts 31b, 31c, 32b, 32c at a lower portion of the hopper 3). When the inclination angles are changed so that the inner faces of the side face parts are directed toward a downward direction, the contact resistance of the objects and storing part 3b when the objects are discharged can be further reduced, and as a result, the dropping discharge speed of the objects can be further enhanced.

The above embodiment requires the stop of the device and the adjustment performed by the operator using the gate shape changing mechanism or the gate drive mechanism in order to change the shape and operation of the gate. However, the gate shape changing mechanism or the gate drive mechanism can be provided with an actuator and the measuring device 1 is provided with a control part for controlling the actuator, and thereby the shape and operation of the gate can be automatically changed. Furthermore, the operator may input the information relating to the receiving opening or the like into the control part, and may automatically acquire the information from the filling device. The operation and shape of the gate may be changed based on the detection result of a detecting means for detecting the dropping length of the objects, the detecting means provided in the downstream of the hopper 3. Thereby, the dropping discharge speed of the objects can be further enhanced during operating the device.

Figure 7:
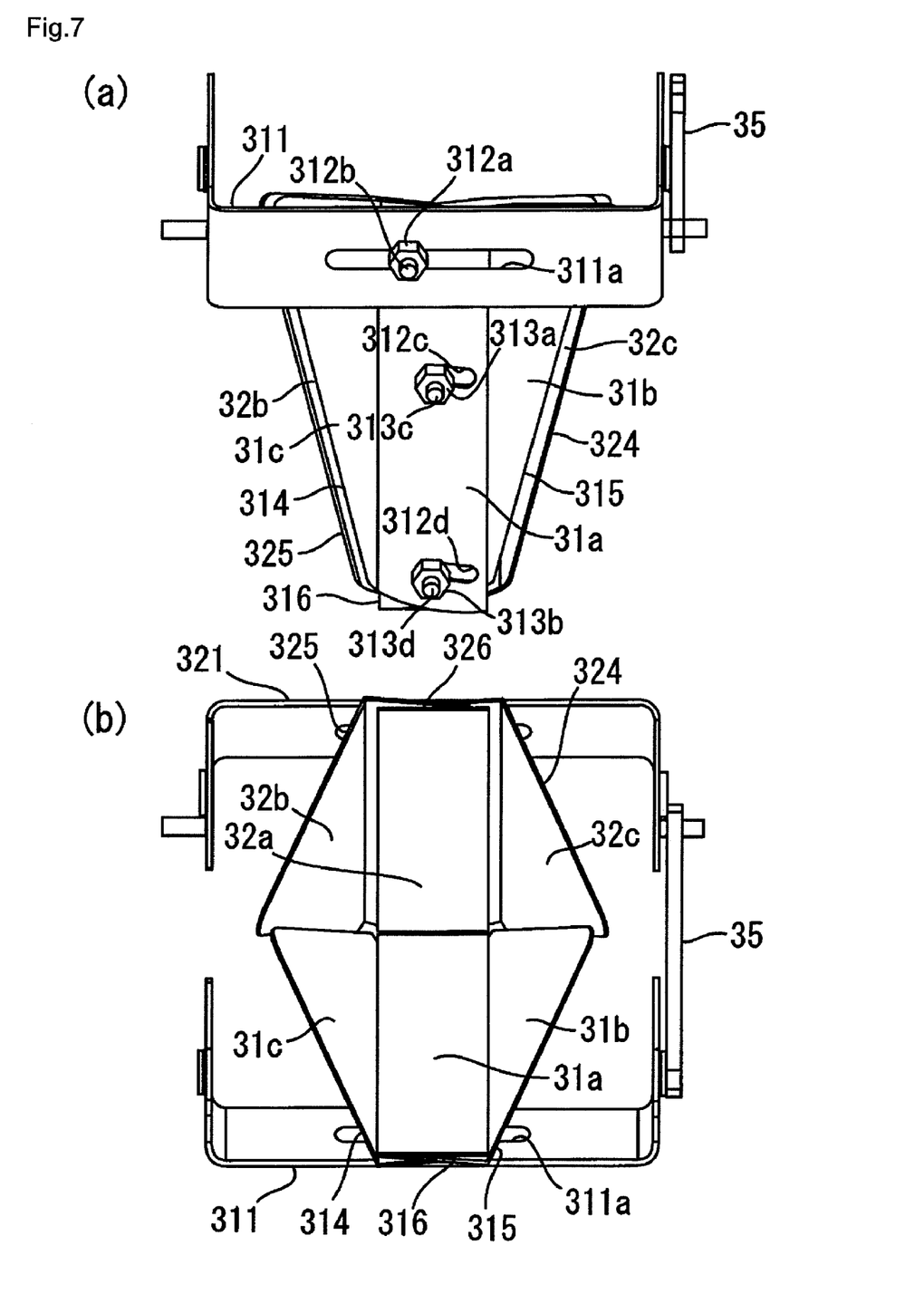
FIG. 7 includes diagrams (a) and (b), wherein the diagram (a) is a side view of a gate unit according to a modification embodiment of the invention in which the number of gate pieces of each gate of the gate unit is set to three, and the diagram (b) is a top plan view of the gate unit according to the modification embodiment illustrated in the diagram (a)

In the above embodiment, two gate pieces are slidably or rotatably fixed to the gate base end parts 311, 321 mutually connected by the oscillation link 35 respectively to change the width of the gate and the inclination angle of a side wall face. However, as shown in FIG. 7, in place of the constitution, three gate piece 314, 315, 316 may be relatively slidably or relatively rotatably fixed to the gate base end part 311. On the other hand, three gate pieces 324, 325, 326 may be also relatively slidably or relatively rotatably fixed to the gate base end part 321. Thereby, the width of the gate can be largely set by adding the gate pieces 316, 326.

Figure 8:
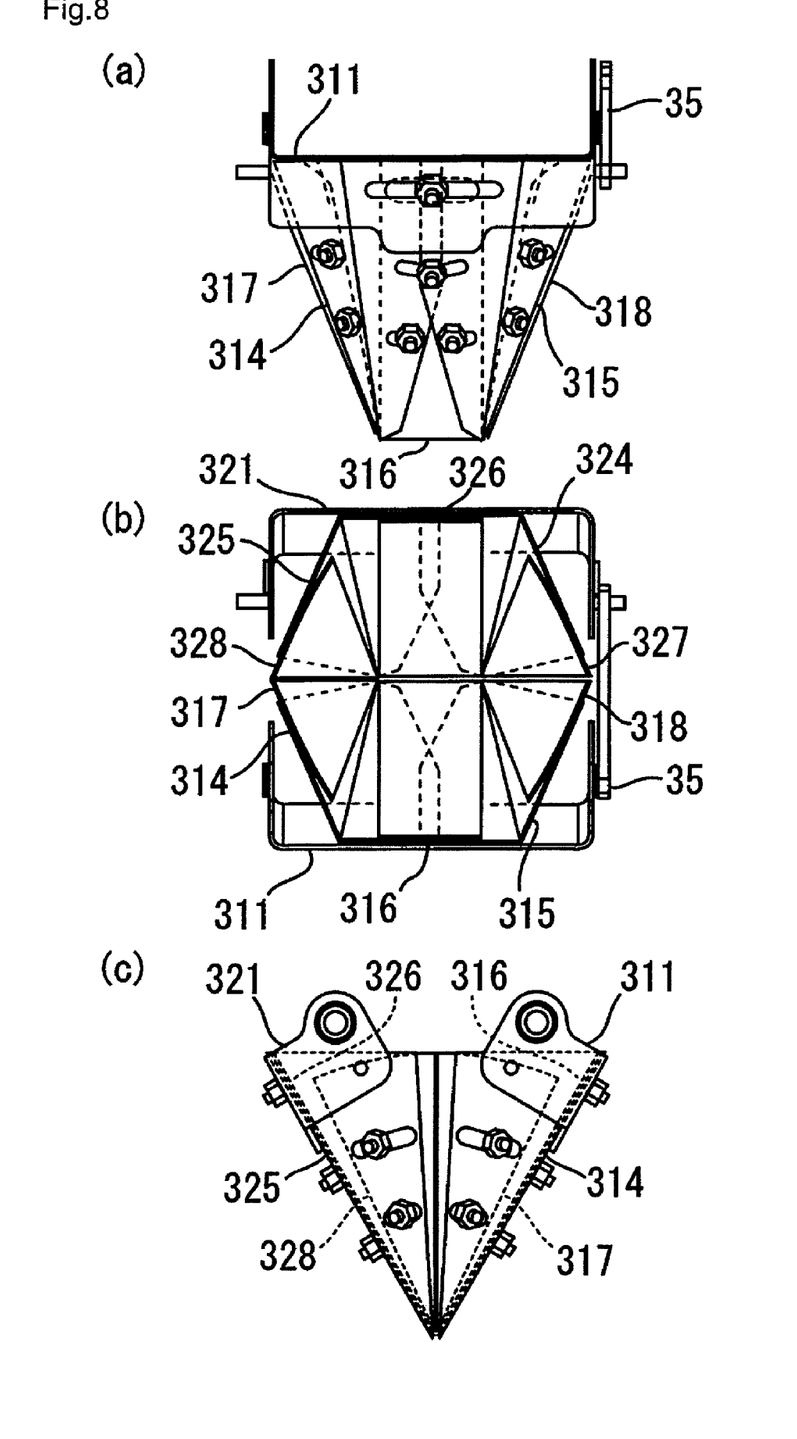
FIG. 8 includes diagrams (a) to (c), wherein the diagram (a) is a side view of a gate unit according to another modification embodiment of the invention in which auxiliary gate pieces of each gate of the gate unit are added, the diagram (b) is a top plan view of the gate unit according to the modification embodiment illustrated in the diagram (a), and the diagram (c) is a front view of the gate unit according to the modification embodiment illustrated in the diagrams (a) and (b)
Figure 9:
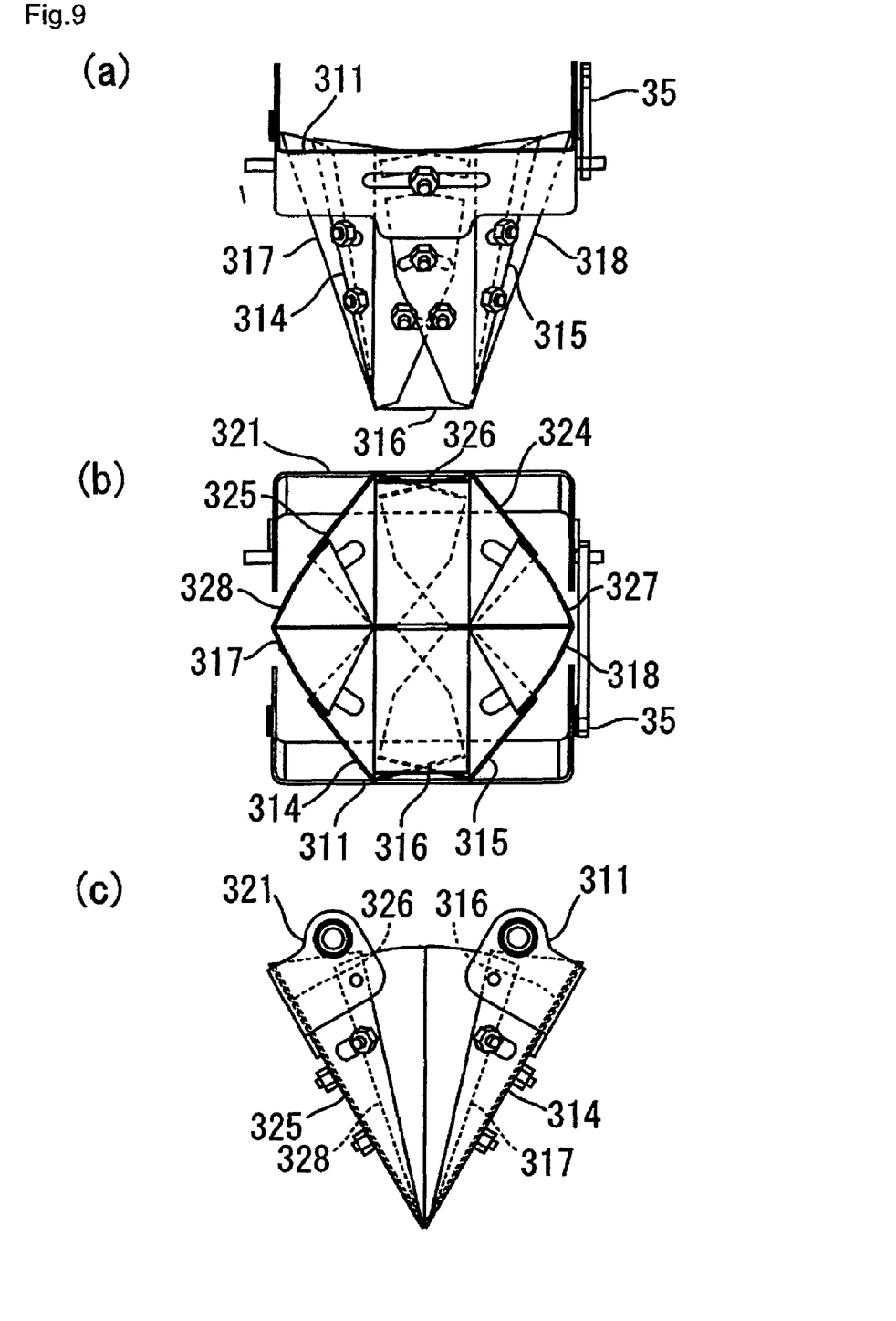
FIG. 9 includes diagrams (a) to (c), wherein the diagram (a) is a side view of the gate unit illustrated in the diagrams (a) to (c) of FIG. 8 showing a state where a width and inclination angle of side face parts of the gate unit are different from those shown in the diagrams (a) to (c) of FIG. 8, the diagram (b) is a top plan view of the gate unit in the state illustrated in the diagram (a), the diagram (c) is a front view of the gate unit in the state illustrated in the diagrams (a) and (b).

In the above embodiment, when the side face parts are largely inclined (set down), the gap between the end parts of the side face parts facing with each other may be largely opened to cause the spilling of the objects from the gap. Thus, for example, as shown in FIGS. 8, 9, auxiliary gate pieces 317, 318, 327, 328 capable of being developed in a fan shape from the gate pieces 314, 315, 324, 325 forming side wall parts 31b, 31c, 32b, 32c to fill the gap between the gates may be provided on the gates 31, 32 shown in FIG. 7. Thereby, the measuring device 1 can correspond to the case where the amount of the objects supplied to the filling device 4 is increased.

The measuring device of the invention is not limited to the above embodiment. Of course, various variations can be added within the range which does not depart from the scope of the invention.

The invention claimed is:

1. A measuring device comprising:
    a measuring part configured and arranged to discharge a group of objects measured in a predetermined weight at a predetermined time interval; and
    a hopper disposed below the measuring part and including a gate unit that is selectively rotatably opened/closed, the gate unit defining a wall of the hopper forming an upper receiving opening through which the group of objects measured in the predetermined weight is supplied from the measuring part to the hopper so that the group of objects is stored in the gate unit when the gate unit is closed and a lower discharging opening through which the group of objects is discharged to a receiving opening of a filling device disposed below the lower discharging opening when the gate unit is opened, a shape of the wall of the hopper and opening degrees of the upper receiving opening and the lower discharging opening being adjustable so that the lower discharging opening is disposed inside the receiving opening of the filling device in a top plan view.

2. A measuring device comprising:
    a measuring part configured and arranged to discharge a group of objects measured in a predetermined weight at a predetermined time interval; and
    a hopper disposed below the measuring part and including a gate unit that is selectively rotatably opened/closed, the gate unit defining a wall of the hopper forming an upper receiving opening through which the group of objects measured in the predetermined weight is supplied from the measuring part to the hopper so that the group of objects is stored in the gate unit when the gate unit is closed and a lower discharging opening through which the group of objects is discharged to a receiving opening of a filling device disposed below the lower discharging opening when the gate unit is opened, a shape of the wall of the hopper and opening degrees of the upper receiving opening and the lower discharging opening being adjustable so that the group of objects has an overall shape with a maximum width that is smaller than a width of the receiving opening of the filling device and a width of an object dropping route of the filling device in a top plan view when the group of objects is stored in the gate unit while the gate unit is closed, as measured in a rotational axis direction of the gate unit.

3. The measuring device according to claim 1, wherein the hopper includes a gate shape changing mechanism arranged to change a width of the gate unit as measured in a rotational axis direction of the gate unit.

4. The measuring device according to claim 3, wherein the gate unit includes a pair of gates with each of the gates having a plurality of gate pieces partially overlapped in a width direction of the gate unit, and
    the gate shape changing mechanism is arranged to relatively slide the gate pieces in the width direction to change the width of the gate unit.

5. The measuring device according to claim 3, wherein the gate unit includes a pair of gates with each of the gates having a center face part that forms a center surface arranged to receive the group of objects stored in the gate unit when the gate unit is closed and a pair of side face parts extending from both side edges of the center face part that form side surfaces arranged to receive the group of objects stored in the gate unit when the gate unit is closed, and
    the gate shape changing mechanism is arranged to change an inclination angle of the side face parts with respect to a vertical center axis of the hopper.

6. The measuring device according to claim 5, wherein the gate shape changing mechanism is arranged to change the inclination angle of the side face parts so that inner surfaces of the side face parts are oriented toward a downward direction.

7. The measuring device according to claim 1, wherein the gate unit is arranged such that an operation and the shape of the gate unit are changed according to information relating to at least one of the receiving opening of the filling device and an object dropping route of the filling device.

8. The measuring device according to claim 1, further comprising
    a detecting section disposed in a downstream portion of the hopper to detect a dropping length of the group of objects,
    the gate unit being arranged such that an operation and the shape of the gate unit are changed based on a detection result of the detecting section.

9. The measuring device according to claim 2, wherein the hopper includes a gate shape changing mechanism arranged to change the width of the gate unit.

10. The measuring device according to claim 9, wherein the gate unit includes a pair of gates with each of the gates having a plurality of gate pieces partially overlapped in a width direction of the gate unit, and the gate shape changing mechanism is arranged to relatively slide the gate pieces in the width direction to change the width of the gate unit.

11. The measuring device according to claim 9, wherein the gate unit includes a pair of gates with each of the gates having a center face part that forms a center surface arranged to receive the group of objects stored in the gate unit when the gate unit is closed and a pair of side face parts extending from both side edges of the center face part that form side surfaces arranged to receive the group of objects stored in the gate unit when the gate unit is closed, and the gate shape changing mechanism is arranged to change an inclination angle of the side face parts with respect to a vertical center axis of the hopper.

12. The measuring device according to claim 11, wherein the gate shape changing mechanism is arranged to change the inclination angle of the side face parts so that inner surfaces of the side face parts are oriented toward a downward direction.

13. The measuring device according to claim 2, wherein the gate unit is arranged such that an operation and the shape of the gate unit are changed according to information relating to at least one of the receiving opening of the filling device and an object dropping route of the filling device.

14. The measuring device according to claim 2, further comprising a detecting section disposed in a downstream portion of the hopper to detect a dropping length of the group of objects, the gate unit being arranged such that an operation and the shape of the gate unit are changed based on a detection result of the detecting section.

* * * * *